July 9, 1968   W. G. BAUSCH ET AL   3,391,895
SAFETY REAR VISION MIRROR

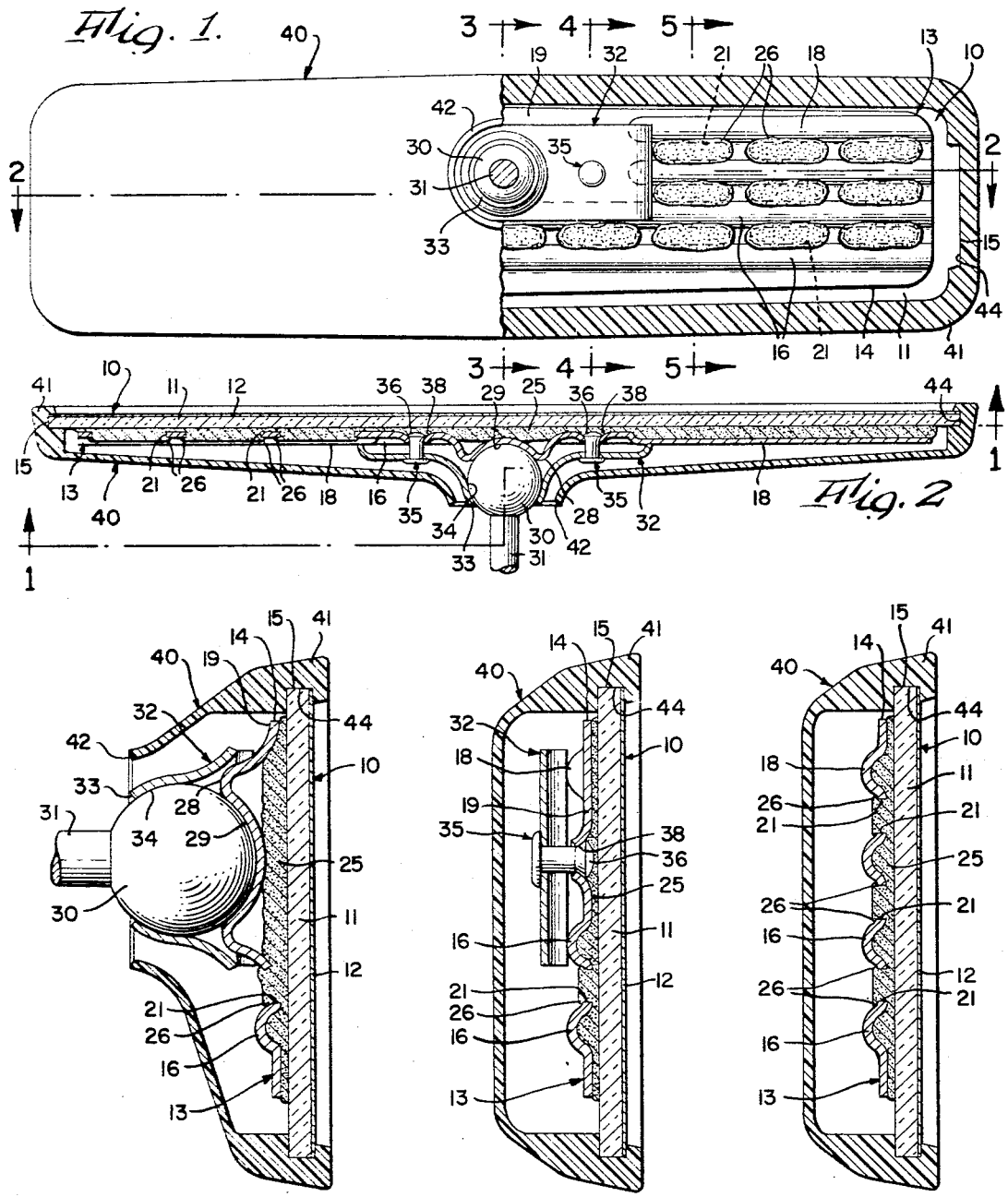

Filed April 25, 1966   2 Sheets-Sheet 2

INVENTORS
William G. Bausch
Ronald C. Perison, Sr.

BY Popp and Sommer
ATTORNEYS

United States Patent Office 3,391,895
Patented July 9, 1968

3,391,895
SAFETY REAR VISION MIRROR
William G. Bausch, West Falls, and Ronald C. Perison, Sr., East Aurora, N.Y., assignors to Standard Mirror Company, Inc., Buffalo, N.Y., a corporation of New York
Filed Apr. 25, 1966, Ser. No. 544,913
1 Claim. (Cl. 248—467)

ABSTRACT OF THE DISCLOSURE

To provide a soft bodied, non-shattering, aimable automobile rear vision mirror, the glass reflective panel has its side remote from the observer adhesively united to a layer of rubber molded to a metal backing plate for the panel and also forming the case for the mirror. A ball mounting attached substantially exclusively to the backing plate permits of aiming the case and panel. The invention resides in these features.

---

It is the principal object of the present invention to provide a safety rear vision mirror structure which, when struck a violent blow, will avoid producing such sharp or jagged edges of metal or glass facing the occupant, and will also avoid producing such flying fragments of glass.

Another object is to produce such a safety rear vision mirror which is low in cost, light in weight and free from vibration induced by the motion of the vehicle, such vibration tending to blur the reflected image.

Another object is to provide such a mirror which is adapted to rear vision mirrors of the type in which the mirror panel can be adjusted in position to provide different degrees of reflectivity.

Another object is to provide such a mirror in which the mirror panel can be encased in either a non-shattering plastic case or in a more flexible rubber case in which the metal parts of the structure can be molded.

Figure 6:
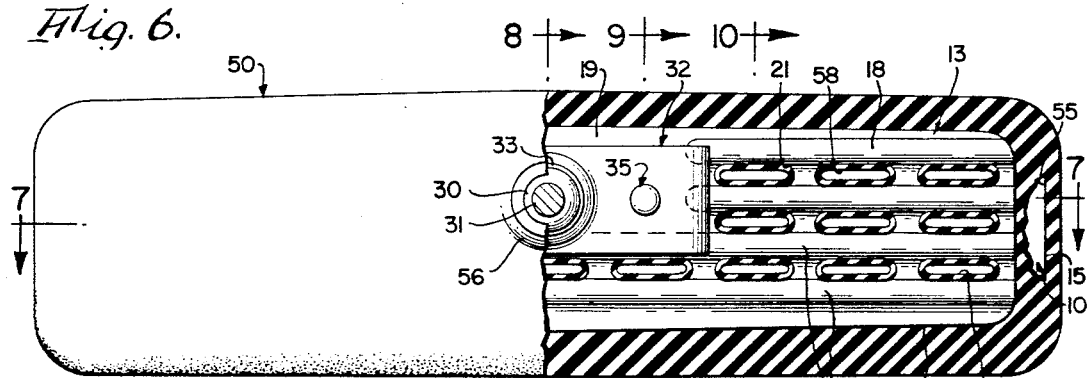
Figure 7:
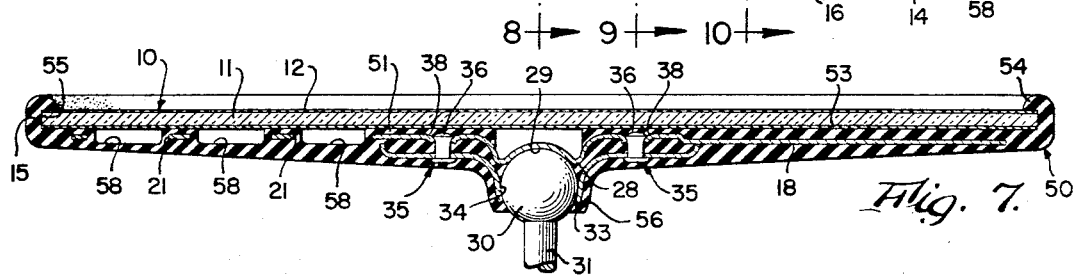
Figure 8:
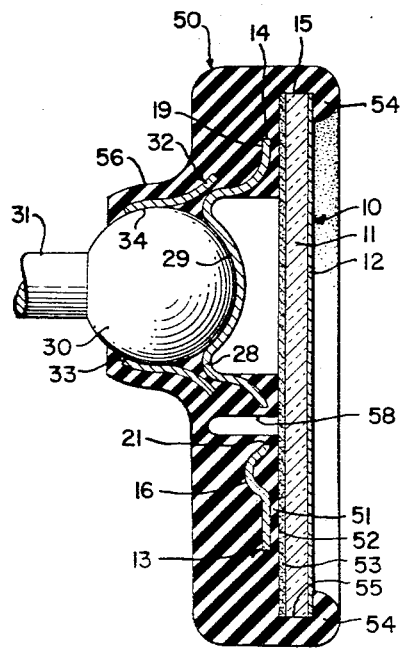
Figure 9:
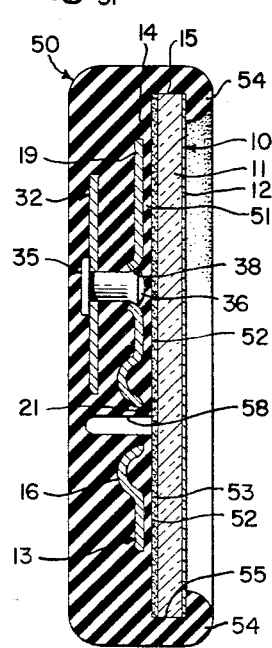
Figure 10:
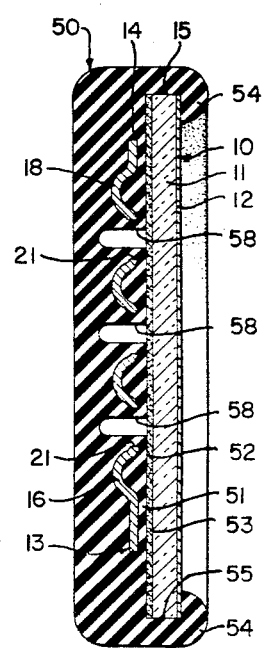

Other objects will be apparent from the following description and drawings in which FIG. 1 is a vertical, longitudinal sectional view, partly in elevation, taken on line 1—1 of FIG. 2. FIG. 2 is a horizontal longitudinal section taken on line 2—2, FIG. 1 looking downwardly. FIGS. 3, 4 and 5 are enlarged transverse sectional views taken on the correspondingly numbered lines on FIG. 1. FIG. 6 is a view similar to FIG. 1 showing a modified form of the invention in which the mirror panel is incased in a flexible rubber case in which the metal parts of the structure are molded. FIG. 7 is a horizontal section taken generally on line 7—7, FIG. 6. FIGS. 8, 9 and 10 are enlarged vertical sections taken on the correspondingly numbered lines on FIG. 6.

The form of the invention shown in FIGS. 1–5 comprises an upright reflective mirror panel 10 shown as comprising a glass panel 11 and a reflective coating 12 applied to the side of this glass panel which faces the occupants of the automobile. This reflective mirror panel 10 can be of conventional shape, being shown as of horizontally elongated form with its corners rounded.

This mirror panel 10 is fixed to a sheet metal backing plate 13, the edges 14 of which are arranged adjacent to the edges 15 of the panel 10 so that the backing plate 13 covers the greater part of the area of the face of the panel 10 remote from its reflective coating 12. This backing panel is provided with a plurality of horizontal ribs 16 and 18 extending longitudinally thereof and which are formed as offsets projecting horizontally away from the glass panel 11. The ribs 16 are at the bottom of the backing plate and extend substantially the full length thereof and the ribs 18 are at the top of the backing plate and extend from an area 19 near the center to the opposite end edges thereof. These ribs are primarily to strengthen or rigidify the backing plate and thereby permit using a lighter gage metal than would be necessary if the backing plate were flat. Over the greater part of its area the backing plate is also preferably provided with a plurality of openings 21 which are preferably in the form of horizontally elongated slots arranged in alinement among the laterally offset ribs 16, 18 and serving to key a layer of adhesive 25 which unites the opposing faces of the mirror panel 10 and backing plate 13. This keying of the adhesive is best illustrated in FIGS. 4 and 5 where it will be seen that a part of the adhesive pushes around the edges of the opening 21 to form lips 26 against the side of the backing plate 13 remote from the mirror panel 10. Any adhesive, such as rubber or silicone adhesive, can be used which has the characteristics as to temperature and humidity set as standards by the automotive industry such as not being adversely affected between —20° and 200° F. and standing up at 100% relative humidity.

To mount the rear vision mirror in an automobile, the backing plate 13 is centrally provided with a crater-like rim 28 offset away from the mirror panel 10 and formed to provide a spherical seat 29. The support comprises a conventional ball 30 fixed to the end of a supporting stem 31 and seated in the seat 29. This ball is held against the seat with the required degree of friction by means of a spring plate 32 having a central opening 33 surrounding a spherical seat 34 which is biased against the stem side of the ball 30. This spring plate is horizontally elongated and provided with transverse flanges at its opposite ends which engage the metal backing plate 13. These opposite ends of the spring plate 32 are secured to the metal backing plate 13 by a pair of rivets 35 the heads 36 of which are countersunk or recessed into offsets 38 in the backing plate 13 so that these rivets cannot engage the glass panel 11.

The stem 31 can be secured to the automobile by any conventional mounting (not shown).

The rear vision mirror includes a case 40 which encloses the metal backing plate 13 and has its rim 41 secured to the bezel 15 and is provided with an opening 42 through which the ball 30 on its stem 31 projects. An important feature of the invention resides in this case being made of a non-shattering organic plastic having a moderate impact strength, a vinyl or polypropylene resin being entirely satisfactory. The rim 41 of this plastic case is preferably thicker than the shell forming the major part of the case and is provided with an internal continuous channel 44 which receives and holds the rim 15 of the mirror panel 10. The case is shaped to have a desirable configuration and its opening 42 is large enough to permit adjustment of the rear vision mirror to any desired angularity, the friction between the ball 30 and the spherical faces 29 and 34 serving to maintain the mirror and its case in such adjusted position.

In the event the arms, head or body of an occupant are violently thrown against such a rear vision mirror in an automobile, the rear vision mirror and its mounting is not apt to be distorted or broken in such manner as to produce cutting edges which would cut the occupant. Thus, since the case 40 is made of plastic while it will distort under a heavy blow, it will not distort so as to produce a sharp cutting edge against the occupant as would be the case if this case were made of sheet metal with its rim rolled around the rim of the mirror as is conventional practice. Furthermore, since the backing plate 13 covers substantially the entire face of the glass panel 11 and since the adhesive 25 unites substantially the entire opposing areas of the backing plate and glass panel, in the event of such a blow against the rear vision mirror by the arms, head or body of an occupant, while the glass mirror panel will be smashed into fragments, none of these fragments are apt to be displaced from the backing plate so as to produce sharp cutting edges to injure the occupant or to produce flying particles which are also liable to cause injury.

In the form of the invention shown in FIGS. 6–10, the glass mirror panel and its reflective coating, as well as all of the metal attachment parts, are the same as the corresponding parts of the invention shown in FIGS. 1–5, and hence the same reference numerals have been employed and the description will not be repeated. However, these metal parts 13, 30, 31, 32 and 35, after being assembled, are placed in a mold (not shown) and molded into and vulcanized to a flexible rubber case 50 for the glass mirror panel 10.

In so molding the rubber case 50, the rubber fills in all the spaces among these metal parts and also forms a rubber wall 51 against the face of the metal backing panel 13 opposing the glass panel 10 and which rubber wall has an exposed flat face 52 conforming in size and shape and adapted to fit against the reverse face of the mirror panel 10. This reverse face of the glass mirror panel 10 is held against this flat face 52 by a layer 53 of adhesive which serves in the same manner as the adhesive 25, to hold onto fragments of the mirror panel 10 in the event the latter is struck a shattering blow.

The rim of the flexible rubber case is in the form of a lip 54 extending around the rim of the mirror panel 10 to engage the obverse coated face 12 thereof and form a channel 55 in which the mirror panel rim is contained. The case 50 is also formed to have a central nipple-like extension 56 which is vulcanized to the spherical extention of the spring plate 32. Soap or other parting material can be applied to the ball 30 to prevent vulcanization of the rubber to this ball.

As with the form of the invention shown in FIGS. 1–5, the rubber extends through keys in the openings 21 in the backing plate 13, but for lightness, core holes or pockets 58 are provided in each of these openings 21, extending from the flat face 52 of the rubber wall 51 to points short of the face of the rubber case toward the front end of the vehicle.

Both forms of the invention are very light in weight, low in cost and attractive in appearance and can also be adapted to multiposition mirrors in which means (not shown) are interposed between the glass panel 11 and ball 30 to adjust the mirror panel to different positions about its generally horizontal longitudinal axis, the glass panel 11 usually being made wedge-shaped and with its reflective coating toward its backing support so that in different positions the mirror will have different degrees of intensity to tone down the intensity of headlights of trailing cars.

By rubber as used in the accompanying claims is meant to include synthetic organic elastomers as well as natural rubber.

We claim:

1. A rear vision safety mirror, comprising a reflective panel, a metal backing plate arranged across the greater part of the area of said reflective panel remote from the observer and having its edges arranged adjacent corresponding edges of said reflective panel, a case made of manually flexible rubber embracing said edges of said reflective panel and extending along the face of said backing plate remote from said reflective panel, said backing plate being molded in said rubber to additionally provide a layer of said rubber between said opposing faces of said reflective panel and said backing plate, an adhesive layer interposed between said reflective panel and said layer of rubber uniting substantially the entire opposing faces of said reflective panel and backing plate whereby fragments of said reflective panel, resulting from a severe blow, remain adhered to said metal backing plate by said adhesive layer, and means attached substantially exclusively to said metal backing plate for adjustably supporting said reflective panel.

References Cited

UNITED STATES PATENTS

| 1,971,396 | 8/1934 | DeWaide | 248—467 X |
| 2,202,697 | 5/1940 | LeHodny | 248—481 X |
| 2,862,419 | 12/1958 | Pryor | 248—481 |
| 3,291,435 | 12/1966 | Herr | 248—481 |

FOREIGN PATENTS

| 995,611 | 6/1965 | Great Britain. |
| 1,006,461 | 10/1965 | Great Britain. |

CHANCELLOR E. HARRIS, *Primary Examiner.*